| United States Patent [19] | [11] | 4,038,251 |
|---|---|---|
| Forgó et al. | [45] | July 26, 1977 |

[54] PROCESS FOR THE MANUFACTURE OF POLYADDITION PRODUCTS CONTAINING IMIDE GROUPS BY REACTION OF POLYMALEIMIDES WITH POLYHYDRIC PHENOLS USING AMINE CATALYST

[75] Inventors: Imre Forgó, Birsfelden; Bruno Schreiber, Basel; Alfred Renner, Munchenstein; Theobald Haug, Frenkendorf, all of Switzerland; André Schmitter, Hegenheim, France

[73] Assignee: Ciba-Geigy Corporation, Ardsley, N.Y.

[21] Appl. No.: 534,105

[22] Filed: Dec. 18, 1974

[30] Foreign Application Priority Data

Dec. 21, 1973 Switzerland .................. 18047/73
Dec. 21, 1973 Switzerland .................. 18048/73

[51] Int. Cl.$^2$ ............... C08G 73/10; C08F 222/40
[52] U.S. Cl. .......................... 260/47 UA; 260/47 CZ; 260/57 R; 260/79.3 M; 260/844
[58] Field of Search ............ 260/47 UA, 47 CZ, 57, 260/79.3 M, 79.7, 844; 528/114

[56] References Cited

U.S. PATENT DOCUMENTS

| 3,741,942 | 6/1973 | Crivello | 260/47 UA |
| 3,821,164 | 6/1974 | Relles et al. | 260/47 CZ |
| 3,840,495 | 10/1974 | Balme et al. | 260/47 UA |
| 3,849,374 | 11/1974 | Renner et al. | 260/47 CZ |
| 3,960,812 | 6/1976 | Renner et al. | 260/47 UA |

*Primary Examiner*—Joseph L. Schofer
*Assistant Examiner*—Peter F. Kulkosky
*Attorney, Agent, or Firm*—Charles W. Vanecek; Luther A. R. Hall

[57] ABSTRACT

According to the invention, polyaddition products containing imide groups are manufactured by reacting certain polyimides (preferably maleimides) with polyhydric phenols in the presence of basic compounds. The preferred embodiment (A) relates to the use of catalysts as basic compounds. In particular, tertiary, secondary or mixed tertiary-secondary amines can be used. A further embodiment (B) relates to the use of primary polyamines as basic compounds. In the latter case, the polyamine participates in the polyaddition mechanism, that is to say the molecules are incorporated into the polyaddition products. In this latter case, catalysts can also be used additionally.

The invention can be utilized particularly in the fields of surface protection, the electrical industry, laminating processes and the manufacture of foamed plastics, and in the building industry.

50 Claims, No Drawings

PROCESS FOR THE MANUFACTURE OF POLYADDITION PRODUCTS CONTAINING IMIDE GROUPS BY REACTION OF POLYMALEIMIDES WITH POLYHYDRIC PHENOLS USING AMINE CATALYST

It is known that polymaleimides can be used as raw materials for the manufacture of polyaddition products and polymerisation products. Thus, for example, French Pat. No. 1,555,564 describes the polyaddition of N,N'-bis-maleimides with primary diamines and the curing of these pre-adducts by thermal polymerisation. The resulting polymers, containing succinimide radicals, are however inadequate for many applications. This is because they have a comparatively low heat distortion point. The flexural strength and impact strength of such polyaddition products is also inadequate in some cases. To this is added the fact that the corresponding process of manufacture also suffers from disadvantages.

U.S. Pat. No. 3,741,942 claims polyaddition products obtained from bis-maleimides and organic dithiols. It is conspicuous that the examples are restricted to polymers which have been manufactured by polyaddition of aliphatic dithiols with the maleimides. These known polyadducts, and their process of manufacture, have all the great disadvantages characteristic of polymers containing sulphur. In particular, the strongly objectionable odour attributable to the dithiols, and the toxic action of the latter, should be pointed out. Since analogous objectionable characteristics also manifest themselves on combustion, and on high temperature decomposition, of these polyadducts containing sulphur, the materials can in most cases not be employed as constructional materials, especially in the building industry, in automobile construction and in aircraft construction. A further disadvantage of these products which should be mentioned is that the softening points are no higher than 110° to 170°C.

It is the object of the invention to provide polycondensation products, containing imide groups, which are based on polymaleimides, do not exhibit the disadvantages of the previously known polyadducts based on polymaleimide, and can be manufactured without handling materials which are harmful to health, and without objectionable odours.

The invention relates to a process for the manufacture of polyaddition products containing imide groups, which is characterised in that polyimides which contain, per molecule, at least two radicals of the general formula

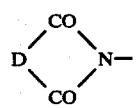
(I)

in which D denotes a divalent radical containing a carbon-carbon double bond, are reacted with polyhydric phenols in the presence of basic compounds at temperatures between 50° and 280° C.

According to a preferred embodiment (A) of the invention, the basic compounds employed are catalysts. The polyimides and the polyhydric phenols are preferably employed in such amounts as to provide 0.3 to 1 equivalent of polyhydric phenol per 1 equivalent of polyimide.

Basic catalysts which are suitable according to this preferred embodiment of the invention are, in particular, tertiary, secondary or primary amines, or amines which contain several different types of amino groups (for example mixed tertiary-secondary amines). These amine catalysts can be either monoamines or polyamines. Where primary and secondary amines are used, monoamines are to be preferred. The following substances may be listed as examples of such amine catalysts: diethylamine, tributylamine, triethylamine, triamylamine, benzylamine, N-methylpyrrolidine, tetramethyldiaminodiphenylmethane, quinoline, N,N-diisobutylaminoacetonitrile, N,N-dibutylaminoacetonitrile, imidazole, benzimidazole and their homologues.

The catalysts should be present in the direction mixture in a concentration of 0.1 to 10% by weight, preferably of 0.5 to 5% by weight, the % by weight data relating to the total amount of the reacting starting components.

A further preferred embodiment (B) of the present invention is the use of primary polyamines as basic compounds, the procedure followed being such as to provide, per 1 equivalent of polyimide, such an amount of polyhydric phenol and primary polyamine, that the sum of the two latter substances is 0.4 to 1.5 equivalents and the equivalent ratio of the polyhydric phenol to the polyamine is 0.5 : 1 to 4 : 1. Preferably, the equivalent ratio of the polyhydric phenol to the polyamine should be 1 : 1 to 4 : 1.

The polyaddition, according to the invention, is based entirely or partially on a novel linking of polyimide and polyhydric phenol in accordance with the following chemical equation (I-P), in which, for simplicity, difunctional reactants and a bis-maleimide are employed.

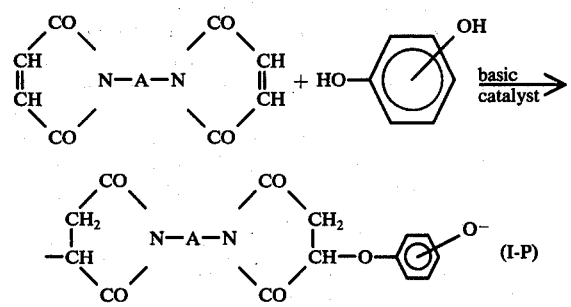

In the case of the preferred embodiment (B) of the invention, the polyaddition is further based on linking of polyimide and polyamine in accordance with the following chemical equation (I-A), in which, for simplicity, difunctional reactants and a bis-maleimide are again employed.

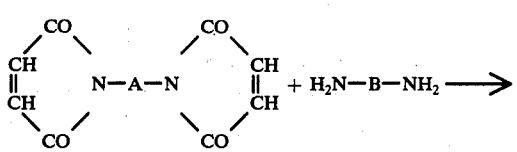

-continued

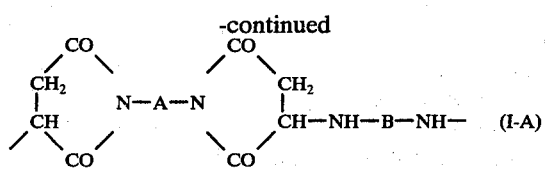 (I-A)

Both types of linking lead in the first instance to molecule chains, and in case (B) chain members produced according to equations (I-A) and (I-P) can be incorporated into the chains alternately, in statistical distribution, or separately, that is to say each cumulatively in the form of a block polymer.

In the course of the reaction according to the invention, a crosslinking reaction also occurs, which is principally based on the homopolymerisation of the double bonds of the polyimides employed. This crosslinking is particularly effective if the number of double bond equivalents is greater than the sum of the amino equivalents and hydroxyl equivalents. The formation of crosslinked products is particularly obvious if trifunctional or higher-functional starting products are used.

The polyaddition which takes place when carrying out the process according to the invention was particularly surprising, in the light of the relevant literature, with regard to the linking according to the scheme of the above equation, (I-P).

Thus it is necessary to draw attention, for example, to U.S. Patent Specification 3,678,015, which claims a process for the manufacture of polyimide prepolymers. According to this invention, for example, maleic anhydride and p,p'-methylene-dianiline in the molar ratio of 2 : 1 are reacted in solution at temperatures of 80° to 200° C. The solvents used are mixtures of a hydrocarbon and a liquid phenol (for example cresol), the cresol being present in large excess. The patent specification does not disclose that the formation of the prepolymer is in any way interfered with by the presence of the phenol. Evidently, the cresol does not participate at all in the course of the reaction.

DT-OS 2,114,076 describes a process for the manufacture of polyimides by reaction of organic diamines with maleic anhydride in the molar ratio of, for example, 1 : 1, in the presence of an acid catalyst. It is emphasised that in this process, again, good results are achieved if cresol is used as the solvent. Here again there is no indication that cresol in any way participates in the reaction of maleic anhydride and amine.

According to DT-AS 1,962,845, which claims, inter alia, a process for the manufacture of polyimide-amines by reaction of maleic anhydride, maleic acid, maleic acid esters or maleic acid amides with di-primary amines, phenols (in particular cresol) are again mentioned as suitable solvents. According to this publication, again, these phenols are not to be understood as reactants but merely as inert solvents.

Finally, it is also necessary once again to draw attention, in this context, to U.S. Pat. No. 3,741,942, which has already been mentioned. This is because in the procedures described in the examples a large excess of cresol is again used. In this case, again, there is no mention whatsoever of a participation of the cresol in the reaction. The use of tri-n-butylamine as the catalyst also does not alter the course of the reaction.

Taking into account this state of the art, it was not to be expected at all that when applying the teaching for a technical process, provided by the invention, to the reactants polymaleimide and polyhydric phenol, a polyaddition would take place. Unexpectedly, however, a polyaddition according to equation (I-P) takes place. The latter, if appropriate in conjunction with the course of the reaction according to equation (I-A), surprisingly leads to high polymers which have excellent heat stability and, at the same time, good mechanical properties.

Most of the polyimides which can be employed according to the invention are described in detail in the literature. They can be manufactured according to the methods described in U.S. Pat. No. 3,010,290 and G.B. Pat. No. 1,137,592, by reaction of the corresponding diamines with the unsaturated dicarboxylic acid anhydrides.

According to the invention it is possible to employ, inter alia, all the polyimides which have already been listed in French Patent 1,555,564. Maleimides, that is to say polyimides of the formula (I), in which D denotes the divalent radical of the formula

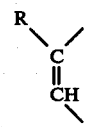 (II)

wherein R represents hydrogen or methyl, are particularly suitable.

A preferred embodiment of the invention is the reaction with polyimides which contain, per molecule, two or three radicals of the formula (I) and hence, in particular, the reaction with bis-maleimides and tris-maleimides.

Particularly suitable bis-maleimides which should be mentioned are compounds of the formula

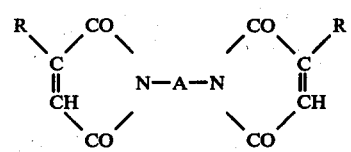 (III)

in which A denotes a divalent organic radical with 2 to 30 C atoms.

The radical A in the formula (III) preferably corresponds to the formula

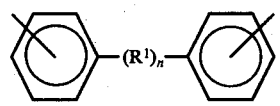 (IV)

bonds wherein $R^1$ represents one of the radicals -CH$_2$-,

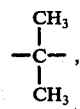

-SO$_2$-, -SO-, -S- and -O- and n is - or 1.

The following substances may be mentioned as specific examples of known polyimides which are suitable for the process according to the invention: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylemethane-bismaleimide, N,N'-4,4'-3,3'-dichloro-diphenylmethane-bis-maleimide, N,N'-4,4'-diphenyl ether-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phyenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethyl-maleimide, N,N'-4,4'-2,2-diphenylpropane-bis-dimethylmaleimide, N,N'-hexamethylene-bis-dimethylmaleimide, N,N'-4,4'-diphenyl ether-bis-dimethylmaleimide and N,N'-4,4'-diphenylsulphone-bis-dimethylmaleimide.

It is, however, also possible to employ, for the process according to the invention, new bis-imides and trisimides which have the following formula VII:

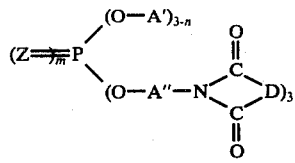

In these, A and A" denote aromatic radicals which, optionally, are substituted or are interrupted by an oxygen atom, an alkylene group or a sulphonyl group, D denotes the radical already defined above, Z denotes an oxygen atom or a sulphur atom, m denotes the number 1 or 0 and n denotes the number 2 to 3.

The new bis-imides and tris-imides of the formula VII are obtained by cyclising dicarboxylic acid monoamide compounds of the general formula VIII

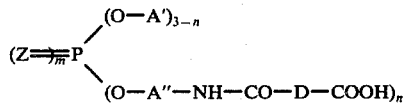

at temperatures below 90° C in the presence of catalysts (Na and K salts), with elimination of n mols of water, and subsequently isolating the compounds of the formula VII by precipitating the reaction product in water or an aqueous alcohol solution. The dicarboxylic acid monoamide compounds employed here can be manufactured according to known processes. In this context, attention should be drawn to U.S. Pat. No. 2,444,536 and G.B. Pat. 1,027,059.

Examples of such new maleimides suitable for the process according to the invention are: the N,N'-bis-maleimide of 4,4'-diamino-triphenyl phosphate, the N,N'-bis-maleimide of 4,4'-diamino-triphenyl thiophosphate, the N,N',N"-tris-maleimide of tris-(4-aminophenyl) phosphate and the N,N',N"-tris-maleimide of tris-(4-aminophenyl) thiophosphate.

According to the invention it is also possible to use mixtures of two or more of any of the abovementioned polyimides.

Polyhydric phenols which should be mentioned as being suitable (optionally as a mixture of different phenols) as starting materials for the process according to the invention are both mononuclear phenols, such as hydroquinone, hydroxyhydroquinone, pyrogallol, phloroglucinol, pyrocatechol and resorcinol, and polynuclear phenols. Examples of such polynuclear phenols are compounds of the formula

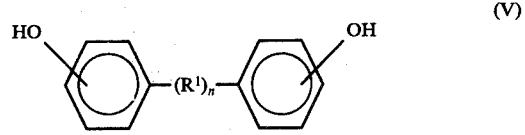

in which $R^1$ and $n$ have the meaning already indicated above. Bisphenol A should be mentioned particularly here. Further compounds which correspond to this formula (V) are bis-(p-hydroxyphenyl)-methane, bis-(p-hydroxyphenyl)-sulphone, bis-(p-hydroxyphenyl)-sulphoxide, bis-(p-hydroxyphenyl) sulphide, bis-(p-hydroxyphenyl) ether and 4,4'-dihydroxy-diphenyl. In principle it is also possible to use those polynuclear phenols in which the hydrogen atoms of the nucleus are in part substituted by halogen atoms. Tetrabromobisphenol A may be mentioned as an example.

Other polynuclear polyphenols which are suitable for the process according to the invention are those compounds which contain condensed rings. 1,4-Dihydroxynaphthalene may be mentioned here as an example.

All polyphenols listed here, which are suitable as starting materials for the process according to the invention, have long been known to those skilled in the art and it is therefore superfluous to deal here with how they may be obtained.

A particular preferred embodiment of the invention is the use of novolacs as polyhydric phenols. Novolacs are, as is known, phenolic resins which are not self-curing, and remain fusible, sprirt-soluble or soluble in aromatics, and are produced by warming phenol and formaldehyde in the ratio of 2:1–1.6 in the presence of acids (tartaric acid, oxalic acid, hydrochloric acid, dilute sulphuric acid and acid salts). Further details on novolacs are described, for example, in "Ullmanns Encyklopadie der technischen Chemie" ("Ullmanns Encyclopedia of Industrial Chemistry") (1962), on pages 458 and 459.

According to the preferred embodiment (B) of the invention, aromatic or araliphatic di- or tri-primary amines with 2 to 40 C atoms in the molecule are employed preferentially. Diamines of the formula

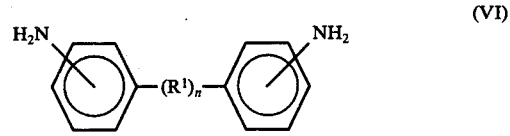

in which $R^1$ and $n$ have the above mentioned meaning, are particularly suitable.

In principle it is also possible to employ all the polyamines which have already been listed in French Pat. No. 1,555,564. In detail, the following polyamines suitable for the process according to the invention should be mentioned: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulphone, 2,4,4'-triaminobenzophenone, 2,4,4'-triamino-3-methyl-diphenylmethane, N,N,N-tri(4-aminophenyl)-amine, tri-(4-aminophenyl)-methane, tri(4-aminophenyl) phosphate, tri-(4-aminophenyl) phosphite, tri-(4-aminophenyl) thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3', 4,4'tetraaminophenyl ether, 3,3',4,4'tetraaminodiphenylmethane, 3,3', 4,4'-tetraaminodiphenylsulphone, 3,5-bis-(3,4'-diaminophenyl)pyridine, 4,4'-diaminodicyclohexylmethane, 1,4-diamino-cyclohexane, m-phenylenediamine, p-phenylenediamine, 4,4'-diaminodiphenyl-methane, bis-(4-aminophenyl)-2,2propane, 4,4'-diaminodiphenyl ether, 4, 4'-diaminodiphenylsulphone, 1,5-diaminonaphthalene, m-xylylenediamine, p-xylylenediamine, ethylenediamine, hexamethylenediamine, bis-(γ-aminopropyl)-5,5-dimethyl-hydantoin and 4,4'-diaminotriphenyl phosphate.

The abovementioned amines which are suitable for the process according to the invention, and the processes for their manufacture, are known so that it is superfluous to deal with them in detail.

For completeness it should be mentioned that polyamines which are obtained by reaction of primary aromatic amines with aldehydes or ketones are also suitable for use as starting materials. In this respect, attention should be drawn to French Pat. No. 1,430,977 and 1,481,932.

Mixtures of several polyamines can also be employed according to the invention.

In the reaction according to the invention, the equivalent ratio of the polyhydric phenol to the polyamine is preferably 1 : 1 to 4 : 1.

The reaction according to the invention is preferably carried out in the melt or partly in the melt and partly in the solid phase. It can, however, also be carried out in solution.

Where the process is carried out in the melt, temperatures of 150° to 250° C are particularly suitable. In solution, on the other hand, lower temperatures of, for example, 50° to 150° C or to 220° C can also be employed.

The following substances should be listed as examples of suitable solvents: aromatics, such as xylene and toluene; halogenohydrocarbons, such as trichloroethylene, tetrachloroethane, tetrachloroethylene and chlorobenzene; ethers, such as dioxane, tetrahydrofurane and dibutyl ether; dimethylformamide, tetramethylurea, dimethylsulphoxide and Nmethylpyrrolidone.

In some cases, particularly when using mixtures of substances of relatively low reactivity, or when carrying out the polyaddition in solution at lower temperatures, it is advisable to accelerate the reaction by basic catalysts in case (B) also. The catalysts to be used for practical purposes the same as have already been listed. They should be present in the reaction mixture in a concentration of 0.2 to 10% by weight, preferably 0.5 to 5% by weight, the % by weight data relating to the total amount of the reacting starting components.

The products produced by the reactions, which contain secondary or tertiary amino groups can also act as catalysts in the course of the reaction.

In general, the process (B) according to the invention is carried out starting from reaction mixtures which in addition to the polyimides simultaneously contain polyhydric phenols and primary polyamines.

However, an alternative possible procedure is first to allow the particular polyimide to react wholly or partly with the particular phenol in the presence of a catalyst and then to allow the remaining reaction with the primary polyamine and, if relevant, with the remaining phenol to take place.

The converse procedure is also possible. First, the particular polyimide can be reacted wholly or partly with the particular primary polyamine. Thereafter, the reaction with the particular polyhydric phenol and, if relevant, with the remaining primary polyamine is carried out.

In the two procedures last described, a prepolymer is, for practical purposes, prepared first. However, it is also possible to prepare, and further process, a prepolymer as follows: after subsequent grinding, of all the starting products, the powder is first heated for a limited period preferably to 140° - 170° C. A partially soluble product which is still thermally mouldable results. This prepolymer may at times have to be reground to give a workable powder, before it is finally cured in the final processing. The prepolymerisation can also be effected by heating a solution or suspension of the starting materials. The prepolymer process last described is also applicable to the preferred embodiment (A).

The manufacture, according to the invention, of the polyaddition products containing imide groups is, as a rule, carried out with simultaneous shaping to give mouldings, sheet-like structures, laminates, adhesive bonds or formed plastics. The additives customary in the technology of thermosetting plastics, such as fillers, plasticisers, pigments, dyestuffs, mould release agents and flame-retarding substances can be added to the curable compositions. Examples of fillers which can be used are glass fibres, mica, quartz powder, kaolin, colloidal silicon dioxide or metal powders, whilst examples of mould release agents which can be used are various waxes, zinc stearate, calcium stearate and the like.

The products which can be manfactured in accordance with the process of the invention can very simply be moulded by the casting process, using a casting mould.

However, they can also be moulded by hot pressing, using a press. In most cases it suffices to heat the materials only briefly to temperatures of 170° to 250° C under a pressure of 1 to 200 kp/cm$^2$ to complete the curing of the moulding thus obtained outside the press.

The process according to the invention can also be carried out by first producing a prepolymer, suspending or dissolving this in a suitable solvent, then impregnating porous sheet-like structures, such as woven fabrics, fibre mats or fibre fleeces, especially glass fibre mats or glass fibre fabrics, with these solutions or suspensions, removing the solvent by a drying process and finally heating the substrates thus obtained in a press, preferably to 170° - 250° C under a pressure of 5 - 200 kp/cm$^2$ pressure. It is also possible only to precure the laminates in the press and to post-cure the products thus obtained in an oven until optimum use properties are achieved.

The process according to the invention, and the polyaddition products which can be manufactured thereby, are above all applicable in the fields of surface protection, the eletrical industry, laminating processes and the manufacture of foamed plastics, and in the building industry.

The following comments should be made specifically on the manufacture of foamed plastics.

To manufacture the foam, blowing agents which are still solid at room temperature but decompose at higher temperatures are added to the mixtures. It is possible to use sulphonylhydrazides, for example benzenesulphonylhydrazide, p-toluenesulphonylhydrazide or 4,4'-oxy-dibenzenesulphonic acid hydrazide, and also substances such as azodicarboxylic acid amides or α, α'-azoisobutyronitrile. Preferably, azodicarboxylic acid amide is used as the blowing agent. The density of the new foams is largely determined by the weight ratio of reaction mixture to blowing agent. Preferably, 0.5 – 7% of blowing agent are used.

To achieve a homogeneous pore structure, a surface-active substance can also be added, in amounts of 0.1 – 1%, relative to the total amount of the reaction mixture.

Before foaming, the reactants should be ground as finely as possible and mixed homogeneously. For example, the starting materials can be dissolved or suspended in low-boiling media, such as fluorocarbons, and after forming a homogeneous mixture the medium is again removed completely. This process is particularly advisable if a reactant has a low melting point so that there is the danger of sticking together during grinding.

To manufacture the cured, foamed mouldings, the mixtures according to the invention, or prepolymers manufactured therefrom, are filled, together with the blowing agent and the surface-active substance, into a suitable mould which can be sealed if necessary. The foaming, moulding and curing takes place in an oven at 80° – 220° C, preferably at 160° – 200° C. The foamed plastic moulding formed can be taken from the mould when it is dimensionally stable at the temperature employed. If necessary, it can be post-cured at the same temperature or at a higher temperature in order thereby to achieve more advantageous use properties.

The new foamed plastic articles can be employed advantageously wherever a foamed material of high heat stability, high heat distortion point, good dielectric properties and high adhesion, even at higher temperatures, is required. They can furthermore be used where processing the previously known foamed plastics of high heat stability was associated with considerable difficulties in moulding and processing.

A further subject of the invention are storage-stable, hot-curable mixtures which are characterised in that they contain (a) polyimides which contain, per molecule, at least two radicals of the general formula

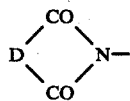

(I)

in which D denotes a divalent radical containing a carboncarbon double bond, (b) polyhydric phenols and (c) the appropriate basic compounds.

These curable mixtures are preferably mixed powders. These are obtained most advantageously by conjointly grinding, or post-grinding, the solid individual components using high intensity grinding equipment (such as, for example, ball mills). From the powder mixture, which in many cases can be employed as such, it is, however, also possible to produce in a known manner, by tabletting, by build-up granulation or by similar processes, a material containing larger particles which is, for example, particularly suitable for the hot pressing process.

MANUFACTURE OF STARTING MATERIALS FOR THE PROCESS ACCORDING TO THE INVENTION

I. Manufacture of novolac F 940 g of phenol (10 mols) are heated to 90° C in a sulphonation flask equipped with a stirrer, internal thermometer and reflux condenser. 25 g of oxalic acid (0.28 mol), dissolved in 780 g of 30% strength formaldehyde (7.8 mols), are added dropwise to the melt over the course of 2 ¼ hours.

After 8 hours post-condensation at the same temperature the water of reaction produced, and the unreacted phenol, are distilled off under reduced pressure (starting at 760 mm Hg and decreasing to 17 mm Hg) and rising temperature, via a descending condenser. The internal temperature of 160° C which is reached finally is maintained until no further volatile constituents are present and the oxalic acid employed has decomposed completely.

862 g of novolac, which becomes hard when cold, are obtained. Appearance: yellow and clear. The novolac has a softening point of 108° C and an average molecular weight of 700.

II. Manufacture of a tris-imide of the formula VII a. 294 g (3.0 mols) of maleic anhydride, dissolved in 800 ml of dioxane, are initially introduced into a reaction vessel equipped with a stirrer and thermometer. A solution of 371 g (1 mol) of tris-(4-aminophenyl) phosphate, dissolved in 2.5 liters of dioxane, is added dropwise to the above solution at 10° – 20° C over the course of 4 – 5 hours. After completion of the addition, the mixture is stirred for a further 1½ hours and the reaction product is then filtered off, washed with chloroform and dried. 669 g of a yellowish substance of melting point 127° – 130° C are obtained. According to the analytical data, this substance has the following structure:

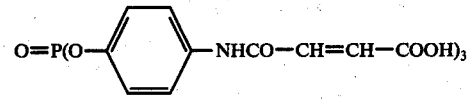

b. 85 g of sodium acetate and 1.1 liters of acetic anhydride are initially introduced into a reaction vessel equipped with a stirrer and thermometer and are warmed to 60° C by means of an oil bath. 954 g of the tris-maleamic acid manufactured according to a) are in portions to this solution over the course of 30 minutes in such a way that the reaction temperature does not exceed 90° C. After completion of the addition, the mixture is allowed to cool to room temperature and thereafter a mixture of 2 liters of isopropanol and 0.7 liter of water is added dropwise to the reaction product, which has partially crystallised out. The substance which has precipitated is filtered off, washed with isopropanol and water until free from acid and dried. 532 g of a substance of melting point 173.5 – 177° C are obtained; according to analytical data, this substance is the tris-maleimide of tris-(4-aminophenyl) phosphate, and has the following structural formula:

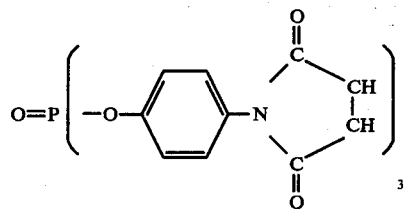

hours at 160° C, 1.5 hours at 180° C and 1.5 hours at 200° C.

Discussion of Examples 1 to 6 and of the experimental results

It can be seen from Tables 1 and 2 that the polyadducts manufactured according to the process of the invention (Examples 1 to 4) in all cases have a higher heat distortion point than the polyadducts which have been manufactured according to French Pat. No. 1,555,564 (Examples 5 and 6).

Table 1

| | Polyimide employed | | | Polyhydric phenol employed | | | | Catalyst employed | | |
|---|---|---|---|---|---|---|---|---|---|---|
| | | Amount | | | Amount | | | | Amount | |
| Example | Type | g | mol | Type | g | mol or equivalent | | Type | g | % by weight |
| 1 | Tris-phenyl-maleimido phosphate | 77.4 | 0.127 | Bisphenol A | 21.65 | 0.095 | mol | Tetramethyl-diaminodi-phenylmethane | 0.99 | 1 |
| 2 | N,N'-p,p'-Diphenyl-methane-bis-maleimide | 68.0 | 0.19 | " | 21.65 | 0.095 | mol | " | 4.5 | 5 |
| 3 | " | 58.0 | 0.19 | " | 21.65 | 0.095 | mol | " | 9.0 | 10 |
| 4 | " | 71.6 | 0.20 | " | 22.8 | 0.1 | mol | " | 9.4 | 10 |
| | | | | Polyamine employed | | | | | | |
| | | | | | Amount | | | | | |
| | | | | Type | g | mol | | | | |
| 5 | " | 72.0 | 0.20 | 4,4'-Diamino-diphenyl-methane | 19.8 | 0.10 | | No additional catalyst | | |
| 6 | " | 106.4 | 0.30 | " | 13.6 | 0.12 | | " | | |

Table 2

| Example | Flexural strength according to VSM 77,103* kg/mm² | Impact strength according to VSM 77,105* cmkg/cm² | Heat distortion point according to ISO/R 75** ° C |
|---|---|---|---|
| 1 | 9.13 | not determined | 242 |
| 2 | 11.63 | not determined | 264 |
| 3 | 12.55 | not determined | 233 |
| 4 | 11.19 | not determined | 237 |
| 5 | 9.2 | 6.9 | 209 |
| 6 | 11.3 | 9.9 | 224 |

*VSM = Standards of the Verein Schweizerischer Maschinenindustrieller
**ISO/R = Standards of the International Standard Organisation/Recommendation

EXAMPLE OF CARRYING THE INVENTION

EXAMPLE 1

77.4 g (0.127 mol) of tris-phenylmaleimido phosphate, 21.65 g (0.095 mol) of bisphenol A and 0.99 g (approx. 1% by weight, relative to the total amount of the reactants) of tetramethyldiaminodiphenylmethane are mixed well, fused in a round bottomed flask at 180° C approx. 15 mm Hg, poured into a mould of dimensions 150 × 150 × 4 mm and heated to 190 C for 14 hours. The mixture is then post cured for 4 hours at 220° C. The properties measured are listed in Table 2

EXAMPLES 2 to 4

In the examples which follow, the casting technique is again used, analogously to Example 1, except that, in part, other reactants are employed and that the ratios of the components are changed. Table 1 gives a survey of the reactants and the amounts of these which are used.

EXAMPLES 5 to 6

In these examples, the technical teaching of French Pat. No. 1,555,564 is followed (again using the casting technique). The ratios used are again summarised in Table 1, and the test results in Table 2. The reaction mixture was cured as follows: 1.5 hours at 140° C, 1.5

EXAMPLE 7

2 parts by weight of bis-malei-diimido-diphenylmethane, 1 part by weight of phenol novolac resin (9.4 hydroxide equivalents/kg, Kofler melting point = 90° C), 0.03 part by weight of 2-ethylimidazole, 6.9 parts by weight of quartz powder, 0.03 part by weight of OP-Wachs (partially esterified montan wax from Messrs. Hoechst, West Germany) and 0.04 part by weight of gas black are mixed, and fused, in a twin-bowl kneader heated to 100° C. When the viscosity of the material rises noticeably, the prepolymer thus obtained is cooled and ground. The free-flowing product is tabletted, prewarmed to 70° C by high frequency heating and moulded in compression moulds heated to 180° C. A flexural strength of 8.5 kp/mm² and a heat distortion point of 195° C are measured. The dielectric constant ($10^3$ Hz) is 4.5 at room temperature, 4.7 at 100° C, 5.0 at 150° C and 5.4 at 200° C.

EXAMPLE 8

2 parts by weight of bis-malei-diimido-diphenylmethane (5.02 double bonds/kg) are warmed to 150° C in a beaker and thereafter 1.1 parts by weight of cresol novolac (9.5 hydroxide equivalents/kg, melting point = 75° C) are mixed in. The mixture is poured out on a cellophane film and cooled, and the resulting resinous product, of melting point 82° C, is ground.

3 parts by weight of this pre-adduct, 0.10 part by weight of accelerator (25% by weight of imidazole fused with 75% by weight of phenol novolac resin) and 6.9 parts by weight of chamotted kaolin are ground in a ball mill for 8 hours. The resulting powder is tabletted and the tablets are pre-warmed to 80° C and compression moulded at 190° C. The properties of the compression mouldings are as follows: flexural strength 9.2 kp/mm$^2$, heat distortion point 205° C, water absorption, 24 hours/23° C, 0.05% by weight, specific resistance 3.5 × 10$^{15}$ ohm.cm.

EXAMPLE 9

2 parts by weight of bis-malei-diimido-diphenylmethane are fused with 0.3 part by weight of novolac resin (9.5 hydroxide equivalents/kg) at 160° C and the mixture is kept at this temperature until, on cooling, a solid resinous adduct is obtained. The resulting resin is cooled rapidly and ground. The Kofler melting point is 76° C.

2.3 parts by weight of this adduct are ground with 0.7 part of cresol novolac (9.5 hydroxide equivalents/kg), 2.0 parts by weight of ground glass fibres, 4.9 parts by weight of Novoculite quartz, 0.02 part by weight of gas black, 0.05 part by weight of OP-Wachs and 0.03 part by weight of 2-ethylimidazole in a ball mill for 10 hours. The tablets produced by pressing the pulverulent compression moulding material are pre-warmed and moulded by the transfer process in compression moulds heated to 180° C.

The compression mouldings exhibit the following properties: flexural strength 10.80 kp/mm$^2$, heat distortion point 214° C, dielectric constant (10$^3$ Hz) 4.1, electrical volume resistance 1.10$^6$ ohm.cm.

EXAMPLES 10 to 19

The procedure adopted in these examples is as follows: the particular polymaleimide is fused with the particular phenol in the presence of the particular catalyst at 180° C and 5 mm Hg and the mixture is poured into the mould described in Example 1 and then heated for 4 hours to 140° C, 7 hours to 190° C and 7 hours to 220° C.

Table 3 lists the starting materials and their amounts for the various examples, and Table 4 lists the test results.

Table 3

| Example | Polyimide | g | mol | Polyphenol | g | mol | Catalyst | g | % by weight |
|---|---|---|---|---|---|---|---|---|---|
| 10 | N,N-p,p-Diphenyl-methane-bis-maleimide | 71.6 | 0.2 | Novolac F | 21.4 | 0.02 | TMDM | 0.93 | 1 |
| 11 | " | 68.0 | 0.19 | Bisphenol A | 21.7 | 0.095 | TMDM | 4.5 | 5 |
| 12 | " | 68.0 | 0.19 | Bisphenol A | 21.7 | 0.095 | HMTA | 0.5 | 0.6 |
| 13 | " | 68.0 | 0.19 | Bisphenol A | 21.7 | 0.095 | HMTA | 1.0 | 1.2 |
| 14 | " | 78.01 | 0.22 | Resorcinol | 11.99 | 0.109 | TMDM | 4.5 | 5 |
| 15 | " | 68.26 | 0.191 | Bisphenol A | 21.74 | 0.096 | TEDA | 0.27 | 0.3 |
| 16 | " | 78.01 | 0.22 | Hydroquinone | 11.99 | 0.109 | TMDM | 4.5 | 5 |
| 17 | " | 68.26 | 0.191 | Bisphenol A | 21.74 | 0.096 | BIA | 0.05 | 0.05 |
| 18 | " | 71.6 | 0.20 | Bisphenol A | 22.8 | 0.10 | TRAA | 9.4 | 10.0 |
| 19 | N,N-p,p-Diphenyl malemimide | 39.0 | 0.108 | Bisphenol A | 12.34 | 0.05 | TMDM | 2.57 | 5 |

Abbreviations:
TMDM: Tetramethyldiaminodiphenylmethane
HMTA: Hexamethylenetetramine
TEDA: Triethylenediamine
BIA: Benzimidazole
TRAA: Triamylamine Table 4

| | Flexural strength (VSM 77,103) in kg/mm$^2$ | | | Heat distortion point (ISO/R 75) ° C |
|---|---|---|---|---|
| Example | originally | after 10 days at 270° C | i.e. change % | |
| 10 | 8.58 | — | | 276 |
| 11 | 13.77 | 11.71 | −15.1 | 274 |
| 12 | 10.26 | 11.20 | +9.1 | 299 |
| 13 | 10.47 | — | | 300 |
| 14 | 11.09 | — | | 300 |
| 15 | 11.49 | 12.36 | +7.6 | 278 |
| 16 | 8.80 | — | | 300 |
| 17 | 8.15 | — | | 267 |
| 18 | 11.19 | — | | 237 |
| 19 | 10.80 | — | | 283 |

EXAMPLE 20

57.3 g (0.16 mol) of N,N'-p,p'-diphenylmethane-bis-maleimide, 14.6 g (0.064 mol) of bisphenol A and 12.7 g (0.064 mol) of 4,4'-diaminodiphenylmethane are mixed well, fused in a round-bottomed flask at 180° C and about 5 mm Hg, poured into a mould of dimensions 150 × 150 × 4 mm, heated to 190° C for 14 hours and post-cured for 4 hours at 220° C. The properties measured are listed in Table 6.

EXAMPLES 21 to 30

The procedure adopted in the examples which follow is analogous to Example 1 except that in part other reactants are employed and that the ratios of the components are varied. Table 5 gives a survey of the reactants and of their amounts used.

Discussion of the examples and experimental results (20 to 30 and 5 to 6)

It can be seen from Tables 5 and 6 that the polyadducts manufactured according to the process of the invention (Examples 20 to 30) in all cases exhibit a higher heat distortion point than the polyadducts which have been manufactured according to French Pat. No. 1,555,564 (Examples 5 and 6). In most cases, the products manufactured according to the invention are also distinctly superior in flexural strength and in impact strength. In such cases, the superiority of the heat distortion point is particularly marked.

Table 5

| Example | Polyamide employed Type | Amount g | mol | Polyhydric phenol employed Type | g | Amount mol or equivalent | Polyamine employed Type | Amount g | mol |
|---|---|---|---|---|---|---|---|---|---|
| 20 | N,N'-p,p'-Diphenyl-methane-bis-maleimide | 57.3 | 0.16 | Bisphenol A | 14.6 | 0.064 mol | 4,4'-Diamino-diphenyl-methane | 12.7 | 0.064 |
| 21 | " | 57.3 | 0.16 | Hydroquinone | 8.8 | 0.084 mol | " | 12.7 | 0.064 |
| 22 | " | 63.0 | 0.176 | Hydroquinone | 15.5 | 0.141 mol | " | 14.0 | 0.07 |
| 23 | " | 71.6 | 0.20 | Novolac F | 10.6 | 0.02 equiv. | " | 9.9 | 0.05 |
| 24 | " | 68.0 | 0.19 | Novolac F | 16.1 | 0.03 equiv. | " | 9.4 | 0.048 |
| 25 | " | 68.0 | 0.19 | Novolac F | 20.1 | 0.04 equiv. | " | 9.4 | 0.048 |
| 26 | " | 62.7 | 0.175 | Novolac F | 9.3 | 0.017 equiv. | " | 17.3 | 0.088 |
| 27 | " | 71.6 | 0.20 | Resol resin | 10.7 | 0.021 equiv. | " | 9.9 | 0.0 |
| 28 | " | 71.6 | 0.20 | Bisphenol A | 18.2 | 0.08 mol | " | 8.0 | 0.04 |
| 29 | " | 71.6 | 0.20 | Hydroquinone | 11.0 | 0.10 mol | " | 8.0 | 0.04 |
| 30 | " | 78.8 | 0.22 | Resol resin | 11.8 | 0.11 equiv. | " | 2.19 | 0.011 |
| 5 | " | 72.0 | 0.20 | — | — | — | " | 19.8 | 0.10 |
| 6 | " | 106.4 | 0.30 | — | — | — | " | 23.6 | 0.12 |

Table 6

| Example | Flexural strength according to VSM 77,103* kg/mm² | Impact strength according tp VSM 77,105* cmkg/cm² | Heat distortion point according to ISO/R 75** ° C |
|---|---|---|---|
| 20 | 16.38 | 13.38 | 234 |
| 21 | 16.01 | 17.00 | 242 |
| 22 | 12.98 | 17.94 | 229 |
| 23 | 13.00 | 9.88 | 232 |
| 24 | 12.39 | 10.75 | 253 |
| 25 | 11.48 | 13.75 | 257 |
| 26 | 16.20 | 19.38 | 243 |
| 27 | 14.86 | 13.81 | 260 |
| 28 | 11.60 | 9.63 | 271 |
| 29 | 11.44 | 11.50 | 281 |
| 30 | 10.73 | 7.38 | 276 |
| 5 | 9.2 | 6.9 | 209 |
| 6 | 11.3 | 9.9 | 224 |

*VSM = Standards of the Verein Schweizerischer Maschinenindustrieller
**ISO/R = Standards of the International Standard Organisation/Recommendation

EXAMPLE 31

Manufacture of the adduct 7 parts by weight of bis-malei-diimido-diphenylmethane are warmed to 150° C in a beaker. 1 part by weight of 4,4'-diaminodiphenylmethane is mixed into the melt and the solution is kept at the same temperature until the viscosity has increased to the point that after cooling a resinous brittle product results. Thereafter the melt is poured out into a flat dish and cooled rapidly.

The resulting solid adduct, Kofler softening point 72° C, was finally ground.

Manufacture of the compression moulding material 8 parts by weight of the adduct, 2 parts by weight of a phenol novolac (9.5 hydroxyl equivalents/kg), 0.08 part by weight of imidazole, 28 parts by weight of chamotted kaolin, 0.2 part by weight of gas black and 0.1 part by weight of montan wax are weighed out into a laboratory ball mill, and ground for 10 hours.

The resulting finely pulverulent product was granulated and tabletted. The tablets, pre-warmed to 70° C, were moulded by the transfer process in compression moulds heated to 170° C. The press time was 10 minutes. A flexural strength (VSM 77,103) of 9.3 kg/mm², an impact strength (VSM 77,103) of 4.5 cmkg/cm², a heat distortion point (ISO/R 75) of 195° C (240° C after post-curing for 10 hours at 200° C) and an electrical volume resistance of $5 \times 10^{15}$ ohm.cm were measured.

EXAMPLES 32 to 37

In these examples, the procedure is as follows: the particular polymaleimide is fused with the particular phenol and the particular primary polyamine at 180° C and about 5 mm Hg and the mixture is poured into the mould described in Example 1. It is then heated to 190° C for 14 hours and to 220° C for 4 hours.

Table 7 lists the starting products of the individual examples and their amounts and Table 8 lists the test results.

Table 7

| Example No. | Polyimide | g | mol | Polyphenol | g | mol | Polyamine | g | mol |
|---|---|---|---|---|---|---|---|---|---|
| 32 | N,N-p,p-Diphenyl-methane-bis-maleimide | 65.35 | 0.180 | Hydroquinone | 10.04 | 0.091 | Daiminodiphenyl ether | 14.60 | 0.073 |
| 33 | " | 66.21 | 0.185 | Hydroquinone | 10.17 | 0.092 | Benzidine | 13.61 | 0.074 |
| 34 (Comparison Example) | " | 73.70 | 0.206 | — | — | — | 4,4'-Diamino-diphenylmethane | 16.30 | 0.082 |
| 35 | " | 57.30 | 0.160 | Bisphenol A | 21.90 | 0.096 | " | 12.70 | 0.064 |
| 36 | " | 57.30 | 0.160 | Hydroquinone | 8.80 | 0.080 | " | 12.70 | 0.064 |
| 37 | " | 63.00 | 0.176 | Hydroquinone | 15.50 | 0.140 | " | 14.00 | 0.070 |

Table 8

| Example No. | Flexural strength (VSM 77,103) kg/mm² originally | after 10 days at 270° C | i.e. change, % | Impact strength (VSM 77,105) cmkg/cm² | Heat distortion point (ISO/R 75 ° C) ° C |
|---|---|---|---|---|---|
| 32 | 13.49 | | | 13.85 | 257 |
| 33 | 8.02 | | | 6.29 | 267 |

Table 8-continued

| Example No. | Flexural strength (VSM 77,103) kg/mm² | | | Impact strength (VSM 77,105) cmkg/cm² | Heat distortion point (ISO/R 75 ° C) ° C |
|---|---|---|---|---|---|
| | originally | after 10 days at 270° C | i.e. change, % | | |
| 34 (Comparison Example) | 14.10 | 8.54 | −39 | | |
| 35 | 15.83 | 12.69 | −20 | | |
| 36 | 13.84 | 11.64 | −16 | | |
| 37 | 16.79 | 11.19 | −33 | | |

EXAMPLE 38

A mixture consisting of 204 g of N,N'-4,4'-diphenylmethane-bis-maleimide, 66.1 g of bis-phenol A, 13.5 g of N,N,N',N'-tetramethyldiaminodiphenylmethane and 2.8 g of a silicone foam stabiliser (Si 3,193) is ground in a ball mill and then (so-called) "advanced" in a kneader at 120° C for 5 hours.

Thereafter, 11.2 g of azodicarboxylic acid amide (blowing agent) are added to this mixture. Kneading is continued for 10 minutes, the mixture is cooled and the product thus obtained is ground; it has a very homogeneous appearance in the pulverulent state.

To manufacture foamed plastics, 14 parts by weight of this powder are introduced into a mould pre-warmed to 140° C. The mould is closed and kept at the above temperature for 3 hours. The product is then additionally cured for 1 hour at 180° C.

This gives a foamed moulding having a smooth surface and a density of 0.4 g/cm³. After cutting open the foam it is found to have a fine and regular pore structure.

EXAMPLE 39

A mixture consisting of 0.2 mol of N,N'-4,4'-diphenylmethane-bis-maleimide and 0.023 equivalent (OH equivalent) of a phenol novolac with an OH content of 3.1% by weight is kneaded at 120° C after addition of 1% by weight of a surface-active agent (Si 3,193).

The temperature in the kneader is raised to 150° C and maintained at this value for 15 minutes.

The mixture is then cooled to 120° C and 4% by weight of azodicarboxylic acid amide are added. Kneading is then continued for a further 10 minutes at the above temperature, after which the mixture is cooled. The total duration of the kneading process is thus 35 minutes. After the mixture thus obtained has been ground to powder in a ball mill, it exhibits a very homogeneous appearance.

7 g of the powder are introduced into a small iron mould, pre-warmed to 160° C. The curing conditions are: 1 hour/160° C + 1 hour/180° C. Under these conditions, a foamed plastic having a density of 0.2 g/cm³ is obtained. The foamed plastic furthermore has a very fine and regular pore structure.

EXAMPLE 40

A mixture consisting of 1 mol of N,N'-4,4'-diphenylmethane-bis-maleimide, 0.4 mol of bis-phenol A and 0.4 mol of diaminodiphenylmethane is kneaded with 1% by weight of silicone foam stabiliser (Si 3,193) and 4% by weight of azodicarboxylic acid amide.

The conditions of the kneading process are: 25 minutes/120° C.

The mixture obtained is ground in a ball mill.

This gives a powder of very homogeneous appearance.

Foamed plastics having a homogeneous pore structure are obtained by observing the following foaming conditions:

| | | |
|---|---|---|
| A. | 1 hour/160° C + 45 minutes/180° C | Density 0.3 g/cm³ |
| B. | 1 hour/160° C + 45 minutes/180° C | Density 0.25 g/cm³ |
| C. | 1 hour/160° C + 45 minutes/180° C | Density 0.15 g/cm³ |
| D. | 1 hour/160° C + 45 minutes/180° C | Density 0.1 g/cm³. |

What we claim is:

1. Process for the manufacture of polyaddition products containing imide groups, wherein polyamides which contain, per molecule, at least two radicals of the formula

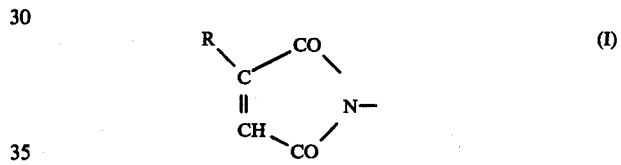

(I)

wherein R is hydrogen or methyl, are reacted with polyhydric phenols in the presence of amines at temperatures between 50° and 280° C.

2. Process according to claim 1, characterised in that the reaction is allowed to take place at temperatures of 150 to 250° C.

3. Process according to claim 1, characterised in that polyimides which contain two or three radicals of the formula (I) per molecule are employed.

4. Process according to claim 1, characterised in that the polyimide employed is a compound of the general formula

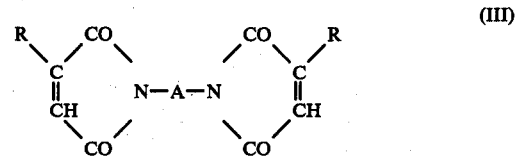

(III)

in which A denotes a divalent organic radical with 2 to 30 C atoms.

5. Process according to claim 4, characterised in that the polyimide employed is a compound of the formula (III) in which A denotes a radical of the formula

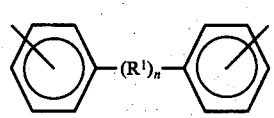

(IV)

wherein R¹ represents one of the radicals —CH₂—,

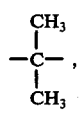

—SO$_2$—, —SO—, —S— and —O— and $n$ is 0 or 1.

6. Process according to claim 5, characterised in that N,N'-4,4'-diphenylmethane-bis-maleimide is employed as the polyamide.

7. Process according to claim 1, characterised in that hydroquinone or resorcinol is employed as the polyhydric phenol.

8. Process according to claim 1, characterised in that the polyhydric phenol employed is a compound of the formula

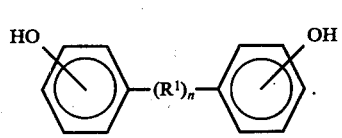

9. Process according to claim 8, characterised in that bisphenol A is employed.

10. Process according to claim 1, characterised in that a novolac is employed as the polyhydric phenol.

11. Process according to claim 1, characterised in that the amine is a catalyst.

12. Process according to claim 11, characterised in that the catalysts are employed in a concentration of 0.1 to 10% by weight, relative to the total amount of the reactants.

13. Process according to claim 11, characterised in that the catalysts are employed in a concentration of 0.5 to 5.0% by weight.

14. Process according to claim 11, characterised in that the caatalysts employed are tertiary, secondary or mixed tertiary-secondary amines.

15. Process according to claim 11, characterised in that the particulate polyimide is reacted with the particular polyhydric phenol in such a ratio as to provide 0.3 to 1 equivalent of polyhydric phenol per 1 equivalent of polyimide.

16. Polyaddition products manufactured acording to the process of claim 11.

17. Process according to claim 1, characterised in that the amines employed are primary polyamines in such a ratio as to provide, per 1 equivalent of polyimide, such an amount of polyhydric phenol and primary polyamine that the sum of the last two substances is 0.4 to 1.5 equivalents and the equivalent ratio of the polyhydric phenol to the polyamine is 0.5:1 to 4:1.

18. Process according to claim 17, characterised in that the reaction is allowed to take place using a ratio of the amounts to correspond to a ratio of equivalents of polyhydric phenol to equivalents of polyamine of 1:1 to 4:1.

19. Process according to claim 17, characterised in that the primary polyamine employed is an aromatic or an araliphatic, di-primary or tri-primary, amine with 2 to 40 C atoms.

20. Process according to claim 17, characterised in that a compound of the formula (VI)

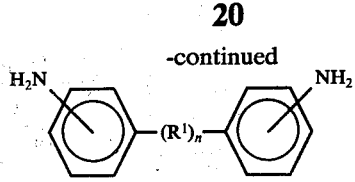

is employed as the primary polyamine.

21. Process according to claim 20, characterised in that 4,4'-diaminodiphenylmethane is employed.

22. Process according to claim 17, characterised in that the reaction is allowed to take place in the presence of catalysts which differ from the products produced during the reaction, in a concentration of 0.2 to 10% by weight, relative to the total amount of the reactants.

23. Process according to claim 22, characterised in that tertiary, secondary or mixed tertiary-secondary amines are employed as catalysts.

24. Process according to claim 22, characterised in that the catalysts are employed in a concentration of 0.5 to 5% by weight.

25. Process according to claim 17, characterised in that it starts from a reaction mixture which in addition to the polyimides simultaneously contains polyhydric phenols and primary polyamines.

26. Process according to claim 17, characterised in that first the reaction of the particular polyimide with the particular polyhydric phenol is allowed to take place completely or partially, in the presence of a catalyst, and thereafter the reaction of the reaction mixture, thus obtained, with the particular primary polyamine, or the terminal reaction, is allowed to take place.

27. Process according to claim 17, characterised in that first the reaction of the particular polyimide with the particular primary polyamine is allowed to take place completely or partially, and thereafter the reaction of the reaction mixture, thus obtained, with the particular polyhydric phenol, or the terminal reaction, is allowed to take place.

28. Polyaddition products manufactured by the process according to claim 17.

29. Storage-stable, hot-curable mixtures, which contain (a) polyimides which contain, per molecule, at least two radicals of the formula

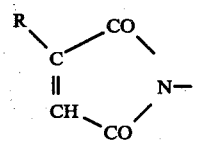

wherein R is hydrogen or methyl, (b) polyhydric phenols and (c) amines.

30. Mixtures according to claim 29, characterised in that they contain polyimides which possess two or three radicals of the formula (I) per molecule.

31. Mixtures according to claim 29, characterised in that they contain, as the polyimide, a compound of the general formula

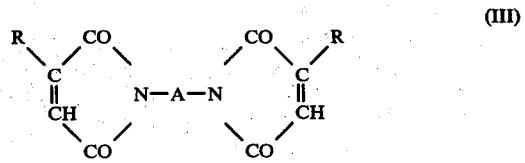

in which A denotes a divalent organic radical with 2 to 30 C atoms.

32. Mixtures according to claim 31, characterised in that they contain, as the polyimide, a compound of the formula (III), in which A denotes a radical of the formula

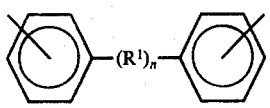 (IV)

wherein R¹ represents one of the radicals —CH₂—, $$-\underset{\underset{CH_3}{|}}{\overset{\overset{CH_3}{|}}{C}}-,$$

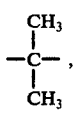

—SO₂—, —SO—, —S— and —O— and n is 0 or 1.

33. Mixtures according to claim 32, characterised in that they contain N,N'-4,4'-diphenylmethane-bis-maleimide as the polyimide.

34. Mixtures according to claim 29, characterised in that they contain hydroquinone or resorcinol as the polyhydric phenol.

35. Mixtures according to claim 29, characterised in that they contain, as the polyhydric phenol, a compound of the formula

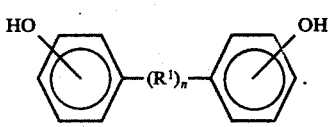 (V)

36. Mixtures according to claim 35, characterised in that they contain bisphenol A.

37. Mixtures according to claim 29, characterised in that they contain a novolac as the polyhydric, mononuclear or polynuclear phenol.

38. Mixtures according to claim 29, characterized in that the amine is a catalyst.

39. Mixtures according to claim 38, characterised in that they contain the catalysts in a concentration of 0.1 to 10% by weight, relative to the total amount of the reactants.

40. Mixtures according to claim 38, characterised in that they contain the catalysts in a concentration of 0.5 to 5.0% by weight.

41. Mixtures according to claim 38, characterised in that they contain tertiary, secondary or mixed tertiary-secondary amines as catalysts.

42. Mixtures according to claim 38, characterised in that they contain the particular polyimide and the particular polyhydric phenol in such a ratio as to provide 0.3 to 1 equivalent of polyhydric phenol per 1 equivalent of polyimide.

43. Mixtures according to claim 29, characterised in that they contain primary polyamines and that the reactants are present in such a ratio as to provide, per 1 equivalent of polyamide, such an amount of polyhydric phenol and primary polyamine that the sum of the last two substances is 0.4 to 1.5 equivalents and the equivalent ratio of the polyhydric phenol to the polyamine is 0.5:1 to 4:1.

44. Mixtures according to claim 43, characterised in that they contain an aromatic or an araliphatic, di-primary or tri-primary amine with 2 to 40 C atoms as the primary polyamine.

45. Mixtures according to claim 44, characterised in that they contain a compound of the formula

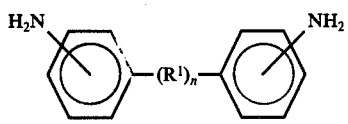 (VI)

as the primary polyamine.

46. Mixtures according to claim 45, characterised in that they contain 4,4'-diaminodiphenylmethane.

47. Mixtures according to claim 43, characterised in that they additionally contain catalysts which differ from the products produced during the reaction, in a concentration of 0.2 to 10% by weight, relative to the total amount of the reactants.

48. Mixtures according to claim 47, characterised in that they contain the catalysts in a concentration of 0.5 to 5% by weight.

49. Mixtures according to claim 47, characterised in that they contain tertiary, secondary or mixed tertiary-secondary amines as catalysts.

50. Mixtures according to claim 43, characterised in that the polyhydric phenol and the polyamine are present in the mixtures in such amounts that the equivalent ratio is 1:1 to 4:1.

* * * * *